United States Patent
Lin et al.

(10) Patent No.: US 11,507,246 B2
(45) Date of Patent: Nov. 22, 2022

(54) METHOD FOR DYNAMICALLY SHOWING VIRTUAL BOUNDARY, ELECTRONIC DEVICE AND COMPUTER READABLE STORAGE MEDIUM THEREOF

(71) Applicant: HTC Corporation, Taoyuan (TW)

(72) Inventors: Yen-Hung Lin, Taoyuan (TW); Ying-Jing Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 56 days.

(21) Appl. No.: 17/064,610

(22) Filed: Oct. 7, 2020

(65) Prior Publication Data

US 2022/0107722 A1    Apr. 7, 2022

(51) Int. Cl.
*G06F 3/0481* (2022.01)
*G06F 3/04815* (2022.01)
*G02B 27/01* (2006.01)
*G06F 3/01* (2006.01)

(52) U.S. Cl.
CPC ....... *G06F 3/04815* (2013.01); *G02B 27/017* (2013.01); *G06F 3/011* (2013.01)

(58) Field of Classification Search
CPC .... G06F 3/04815; G06F 3/011; G02B 27/017
See application file for complete search history.

(56) References Cited

U.S. PATENT DOCUMENTS

| | | | | |
|---|---|---|---|---|
| 10,901,215 | B1* | 1/2021 | Newcombe | G02B 27/0172 |
| 11,073,902 | B1* | 7/2021 | Rahimi | G06F 3/0346 |
| 2016/0042567 | A1* | 2/2016 | Shuster | G06T 19/006 |
| | | | | 345/633 |
| 2016/0124502 | A1* | 5/2016 | Sawyer | G02B 27/017 |
| | | | | 345/633 |
| 2016/0171770 | A1* | 6/2016 | Pedrotti | G06F 3/011 |
| | | | | 345/633 |
| 2016/0313790 | A1* | 10/2016 | Clement | G02B 27/0093 |
| 2017/0123747 | A1* | 5/2017 | Rochford | G06V 20/00 |
| 2017/0255010 | A1* | 9/2017 | Yamamoto | H04M 1/72472 |
| 2017/0372499 | A1 | 12/2017 | Lalonde | |

FOREIGN PATENT DOCUMENTS

| | | |
|---|---|---|
| CN | 107015638 | 6/2020 |
| TW | I669531 | 8/2019 |
| TW | 202036090 | 10/2020 |

OTHER PUBLICATIONS

"Office Action of Taiwan Counterpart Application", dated Sep. 30, 2021, p. 1-p. 8.

* cited by examiner

*Primary Examiner* — Terrell M Robinson
(74) *Attorney, Agent, or Firm* — JCIPRNET

(57) ABSTRACT

The disclosure provides a method for dynamically showing a virtual boundary, an electronic device and a computer readable storage medium thereof. The method includes: obtaining a virtual scene boundary of a virtual reality (VR) environment; determining a distance threshold based on a moving speed of a specific element of a VR system, wherein the specific distance threshold is positively related to the moving speed of the specific element; monitoring a specific distance between the specific element and the virtual scene boundary of the VR environment; in response to determining that the specific distance is smaller than the distance threshold, showing the virtual scene boundary of the VR environment.

15 Claims, 3 Drawing Sheets

METHOD FOR DYNAMICALLY SHOWING VIRTUAL BOUNDARY, ELECTRONIC DEVICE AND COMPUTER READABLE STORAGE MEDIUM THEREOF

BACKGROUND OF THE INVENTION

1. Field of the Invention

The present invention generally relates to a virtual reality (VR) technology, in particular, to a method for dynamically showing a virtual boundary, an electronic device and a computer readable storage medium thereof.

2. Description of Related Art

Generally, when a VR user is immersed in a VR environment, the user may move his/her body during interacting with the VR content. In order to prevent the user from colliding with nearby objects or walls in the real world during the movement of the body, the VR system will show the boundary of the VR world when the distance between the user and the boundary of the VR world is smaller than a distance threshold.

However, when the user moves too fast, the timing of showing the boundary of the VR world may be too late, such that the user may not have enough reaction time to slow down. In this case, the user may accidentally cross the boundary of the VR world and collide with nearby objects or walls in the real world, which may make user experience worse.

SUMMARY OF THE INVENTION

Accordingly, the present disclosure is directed to a method for dynamically showing a virtual boundary, an electronic device and a computer readable storage medium thereof for solving the above technical problems.

The disclosure provides a method for dynamically showing a virtual boundary, including: obtaining a virtual scene boundary of a virtual reality (VR) environment; determining a distance threshold based on a moving speed of a specific element of a VR system, wherein the specific distance threshold is positively related to the moving speed of the specific element; monitoring a specific distance between the specific element and the virtual scene boundary of the VR environment; in response to determining that the specific distance is smaller than the distance threshold, showing the virtual scene boundary of the VR environment.

The disclosure provides an electronic device including a storage circuit and a processor. The storage circuit stores a plurality of modules. The processor is coupled to the storage circuit and accesses the modules to perform following steps: obtaining a virtual scene boundary of a virtual reality (VR) environment; determining a distance threshold based on a moving speed of a specific element of a VR system, wherein the specific distance threshold is positively related to the moving speed of the specific element; monitoring a specific distance between the specific element and the virtual scene boundary of the VR environment; in response to determining that the specific distance is smaller than the distance threshold, showing the virtual scene boundary of the VR environment.

The disclosure provides a non-transitory computer readable storage medium, recording an executable computer program to be loaded by an electronic device to execute steps of: obtaining a virtual scene boundary of a virtual reality (VR) environment; determining a distance threshold based on a moving speed of a specific element of a VR system, wherein the specific distance threshold is positively related to the moving speed of the specific element; monitoring a specific distance between the specific element and the virtual scene boundary of the VR environment; in response to determining that the specific distance is smaller than the distance threshold, showing the virtual scene boundary of the VR environment.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
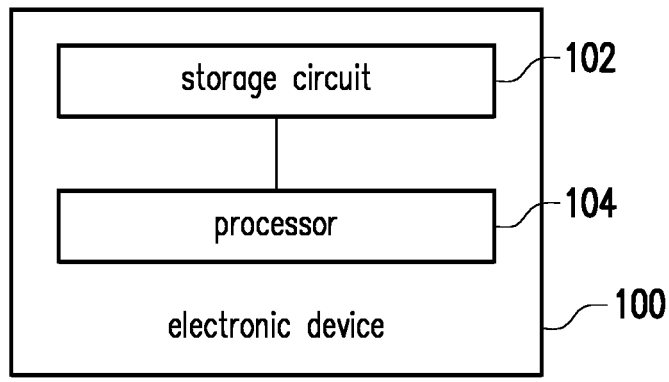
FIG. 1 is a functional diagram of an electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which is a functional diagram of an electronic device according to an embodiment of the disclosure. In various embodiments, the electronic device 100 is, for example, a computer device for providing/generating VR content in a VR system, and the VR content can be viewed by the wearer of the head-mounted display through the head-mounted display in the VR system, but the disclosure is not limited thereto. In FIG. 1, the electronic device 100 includes a storage circuit 102, and a processor 104.

The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

In the embodiments of the disclosure, the processor 104 may access the modules stored in the storage circuit 102 to implement the method for dynamically showing a virtual boundary provided in the disclosure, which would be further discussed in the following.

Figure 2:
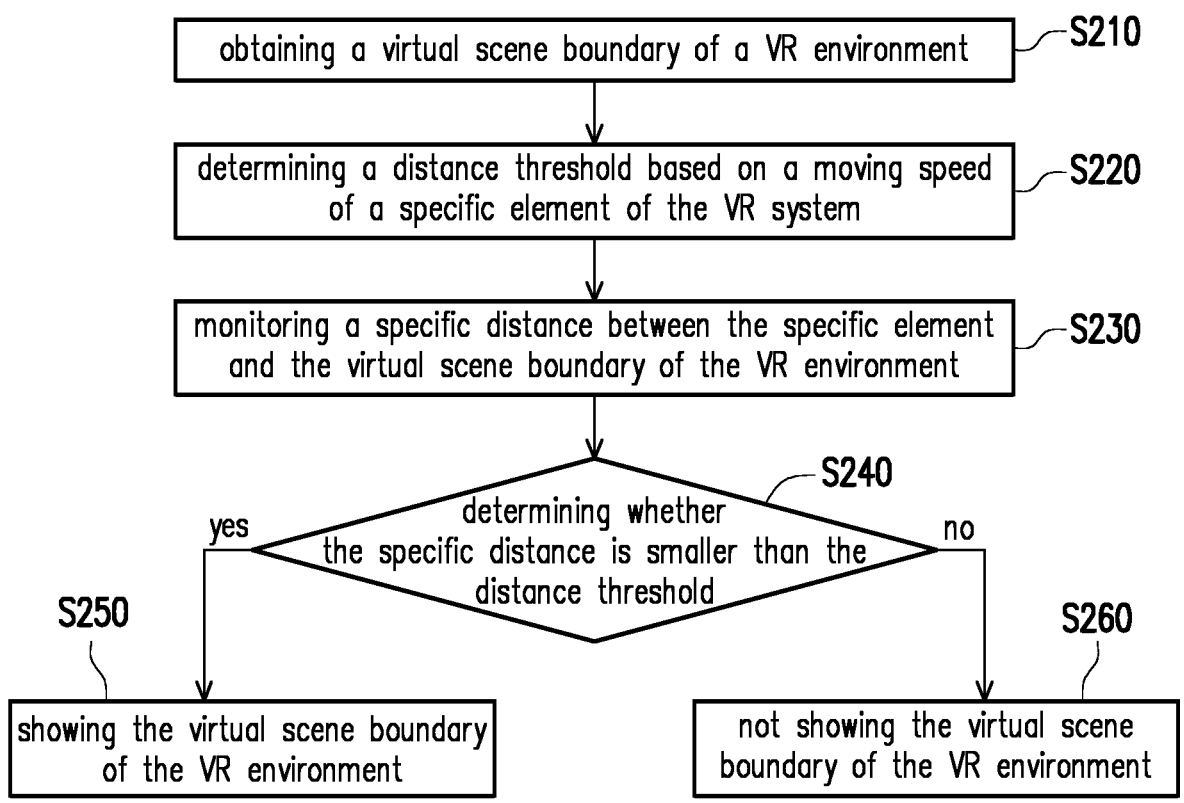
FIG. 2 shows a flow chart of the method for dynamically showing a virtual boundary according to an embodiment of the disclosure.

See FIG. 2, which shows a flow chart of the method for dynamically showing a virtual boundary according to an embodiment of the disclosure. The method of this embodiment may be executed by the electronic device 100 in FIG. 1, and the details of each step in FIG. 2 will be described below with the components shown in FIG. 1.

In step S210, the processor 104 may obtain a virtual scene boundary of a VR environment. In an embodiment, this virtual scene boundary may be set by a user when setting up the VR system, and may generally represent a boundary of a movable space in a real environment when the user uses the VR system. In an embodiment, the VR environment is provided by the VR system to which the electronic device 100 belongs, for example. In general, the VR system may include elements such as a head-mounted display (HMD), a position tracking device, and/or a controller that can be held by the user. In the process of installing the VR system, the user will normally set the corresponding virtual scene boundary according to the requirements of the VR system. Therefore, the processor 104 may directly access the relevant system setup to obtain the virtual scene boundary, but the disclosure is not limited thereto.

In step S220, the processor 104 may determine a distance threshold based on a moving speed of a specific element of the VR system. In one embodiment, the specific element of the VR system may be the HMD or other elements of the VR system, for example a controller, a joystick, a glove, a ring, or a tracker, but the disclosure is not limited thereto. In this case, the moving speed of the specific element may be the moving speed of the HMD or other elements of the VR system, which corresponds to the moving speed of the wearer of the HMD or other elements of the VR system.

In some embodiments, the distance threshold may be positively related to the moving speed of the specific element. That is, a higher moving speed would result in a larger distance threshold, and vice versa.

In one embodiment, the processor 104 may determine the distance threshold based on the moving speed of the specific element and a predetermined reaction time, wherein the predetermined reaction time may be an average reaction time of a human, such as 0.2 second, or the predetermined reaction time may be adjusted by a user, but the disclosure is not limited thereto. For example, once the predetermined reaction time is defined, the distance threshold may be correspondingly determined by multiplying the moving speed with the predetermined reaction time. In some embodiments, the distance threshold may be obtained by performing other (linear) combination to the moving speed and the predetermined reaction time (or the modifications thereof) based on the requirements of the designer, but the disclosure is not limited thereto.

However, in some cases, if the specific element moves with a low moving speed but high acceleration, the timing of showing the virtual scene boundary may be still too late. Therefore, in some embodiments, the processor 104 may determine the distance threshold based on the moving speed of the specific element, the predetermined reaction time, and an acceleration of the specific element. For example, the distance threshold may be determined based on $v_0 t + \frac{1}{2} at^2$, wherein $v_0$ may be the moving speed of the specific element, t may be the predetermined reaction time, and a may be the acceleration of the specific element. In some embodiments, the distance threshold may be obtained by performing other (linear) combination to the moving speed, the predetermined reaction time, and the acceleration (or the modifications thereof) based on the requirements of the designer, but the disclosure is not limited thereto.

Next, in step S230, the processor 104 may monitor a specific distance between the specific element and the virtual scene boundary of the VR environment. In step S240, the processor 104 may determine whether the specific distance is smaller than the distance threshold.

In one embodiment, in response to determining that the specific distance is smaller than the distance threshold, the processor 104 may perform step S250 to show the virtual scene boundary of the VR environment. That is, the virtual scene boundary is visible to the user in the VR content provided by the VR system. Therefore, the user of the VR system may be notified to not crossing the virtual scene boundary.

On the other hand, in response to determining that the specific distance is not smaller than the distance threshold, the processor 104 may perform step S260 to not show the virtual scene boundary of the VR environment. That is, the virtual scene boundary is invisible to the user in the VR content provided by the VR system. Therefore, the virtual scene boundary would not be unnecessarily shown to interrupt the experience of the user.

In brief, when the specific element moves fast (i.e., the user moves fast), the distance threshold would be larger, such that the virtual scene boundary may be shown earlier. Accordingly, the user of the VR system may have enough reaction time to slow down, and hence the possibility of the user crossing the virtual scene boundary may be reduced.

On the other hand, when the specific element moves slowly (i.e., the user moves slowly), the distance threshold would be smaller, such that the virtual scene boundary may be shown later. Therefore, the user would not be interrupted by the unnecessarily shown virtual scene boundary.

In some embodiments, in response to determining that the moving speed of the specific element is smaller than a speed threshold, the processor 104 may define the distance threshold as a predetermined distance. In one embodiment, the speed threshold may be an average moving speed of regular VR users. That is, in case of the user moving regularly, the processor 104 may not dynamically adjusting the distance threshold, but the disclosure is not limited thereto.

In one embodiment, after step S250, in response to determining that the specific distance becomes not smaller than the distance threshold, the processor 104 may hide the virtual scene boundary of the VR environment. That is, when the specific element is far enough from the virtual scene boundary, the processor 104 may make the virtual scene boundary disappear to not interrupting the experience of the user, but the disclosure is not limited thereto.

Figure 3A:
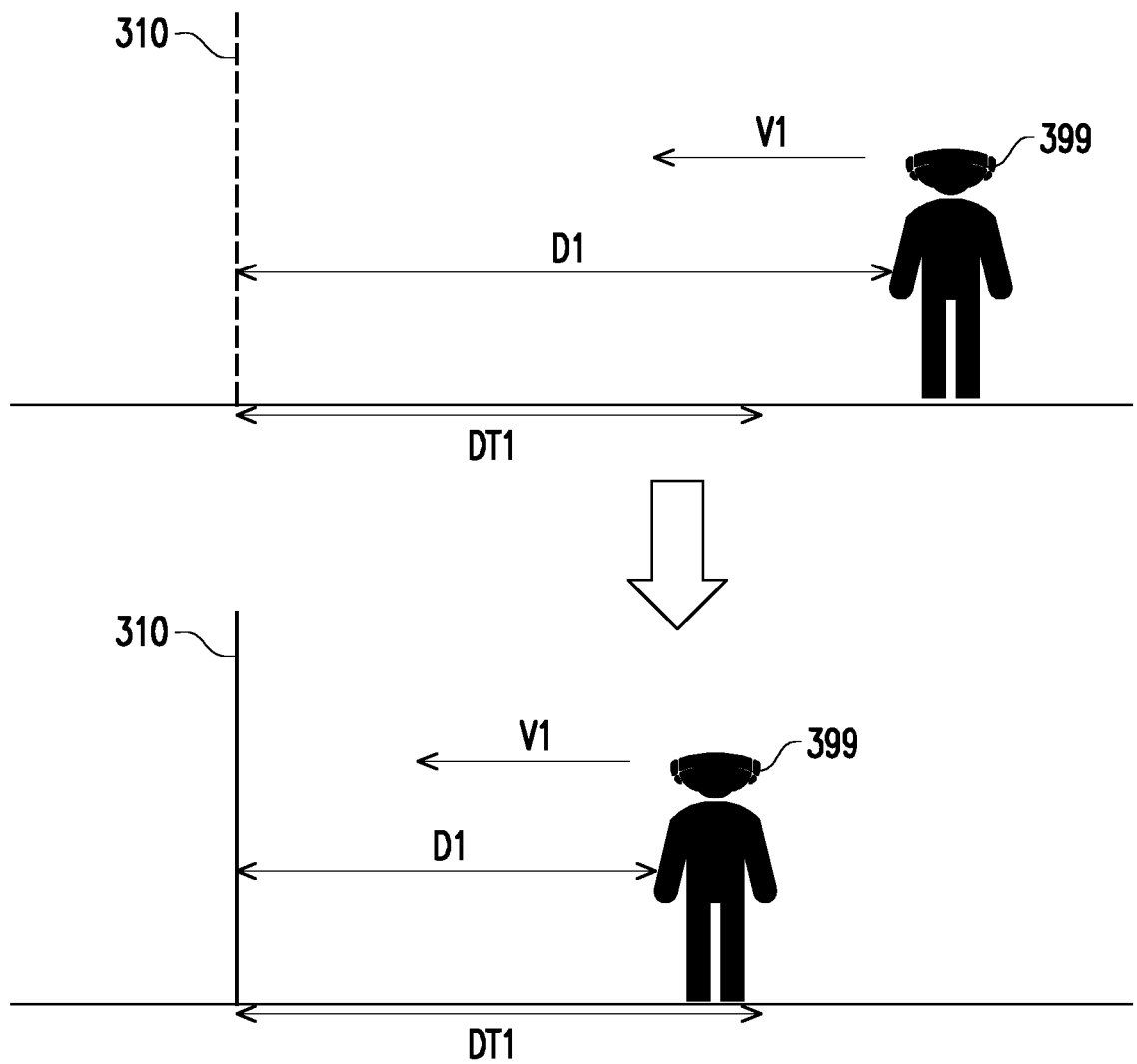
FIG. 3A is a schematic diagram illustrating an application scenario according to a first embodiment of the disclosure.
Figure 3B:
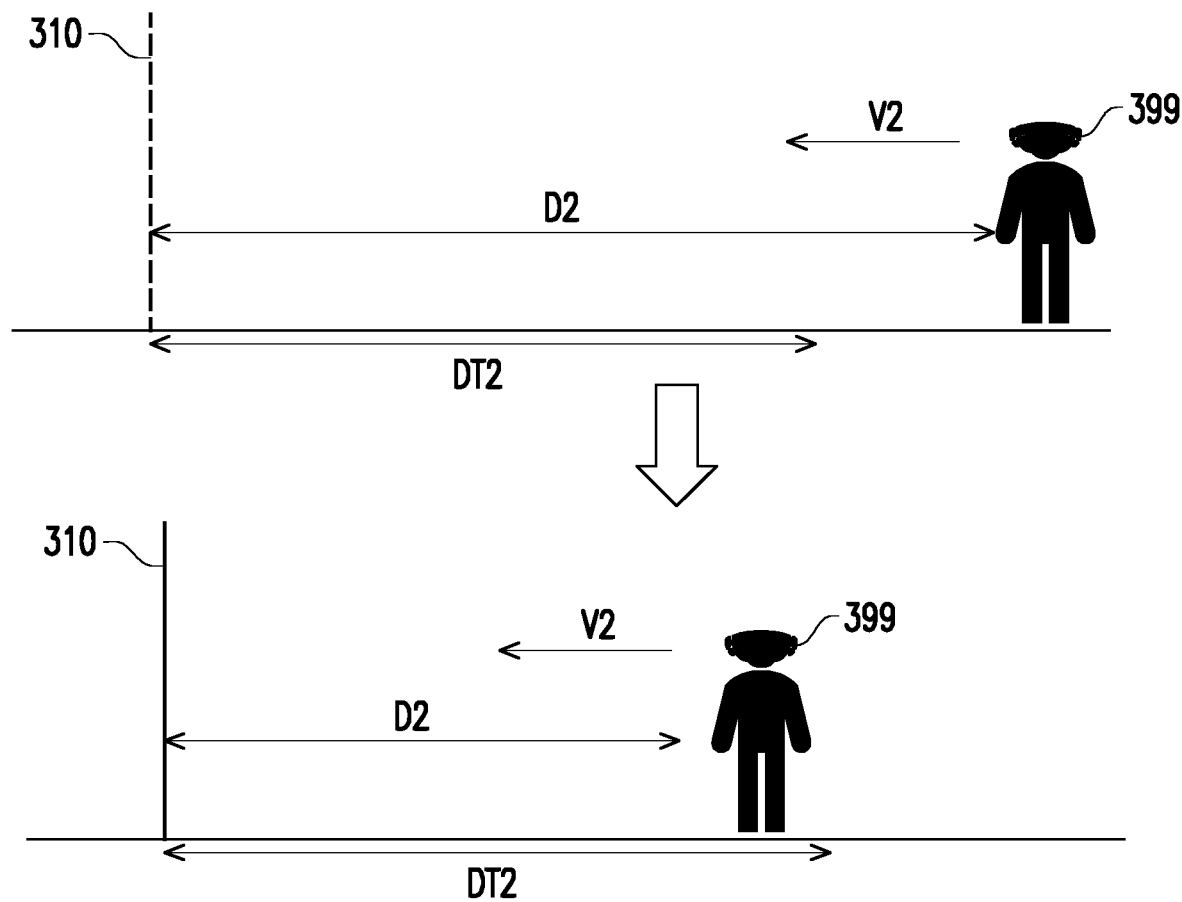
FIG. 3B is a schematic diagram illustrating an application scenario according to a second embodiment of the disclosure.

For better understanding the concept of the disclosure, FIG. 3A and FIG. 3B would be used as examples, wherein FIG. 3A is a schematic diagram illustrating an application scenario according to a first embodiment of the disclosure, and FIG. 3B is a schematic diagram illustrating an application scenario according to a second embodiment of the disclosure.

In the upper half of FIG. 3A, the specific element 399 (e.g., an HMD) may be moving with a speed V1 (i.e., the user wearing the HMD is moving with the speed V1) towards the virtual scene boundary 310, in which the virtual scene boundary 310 is illustrated as a dotted line for representing that the virtual scene boundary 310 is hidden (i.e., invisible to the user). In this case, the processor 104 may correspondingly determine a distance threshold DT1 based on the speed V1.

In the lower half of FIG. 3A, when the specific distance D1 between the virtual scene boundary 310 and the specific element 399 is smaller than the distance threshold DT1, the processor 104 may correspondingly show the virtual scene boundary 310 (illustrated as solid line for representing that the virtual scene boundary 310 is visible to the user) for notifying the user.

In the upper half of FIG. 3B, the specific element 399 (e.g., an HMD) may be moving with a speed V2 (which is higher than the speed V1 in FIG. 3A) towards the virtual scene boundary 310, in which the virtual scene boundary 310 is illustrated as a dotted line for representing that the virtual scene boundary 310 is hidden (i.e., invisible to the user). In this case, the processor 104 may correspondingly determine a distance threshold DT2 based on the speed V2. Compared with the distance threshold DT1 in FIG. 3A, the distance threshold DT2 may be larger because the speed V2 is higher than the speed V1.

In the lower half of FIG. 3B, when the specific distance D2 between the virtual scene boundary 310 and the specific element 399 is smaller than the distance threshold DT2, the processor 104 may correspondingly show the virtual scene boundary 310 (illustrated as solid line for representing that the virtual scene boundary 310 is visible to the user) for notifying the user. Therefore, the user of the VR system may have enough reaction time to slow down, and hence the possibility of the user crossing the virtual scene boundary may be reduced.

In one embodiment, after the processor 104 obtains the specific distance in step S230, the processor 104 may further determine whether the specific distance is equal to a reference distance, wherein the reference distance is larger than the distance threshold determined in step S220. In response to determining that the specific distance is equal to the reference distance, the processor 104 may obtain a specific acceleration of the specific element, wherein the specific acceleration may be the acceleration at the timing when the specific element is spaced from the virtual scene boundary by the reference distance, but the disclosure is not limited thereto.

Next, the processor 104 may determine whether the specific acceleration of the specific element is positive. If the specific acceleration is positive, it represents that the moving speed of the specific element corresponding to the user becomes faster and faster to the virtual scene boundary and the specific element is more possible to reach the virtual scene boundary even if the moving speed thereof is slow. Accordingly, the processor 104 may enlarge the distance threshold, such that the virtual scene boundary of the VR environment may be shown earlier in step S250 for warning the user.

On the other hand, if the specific acceleration is not positive (i.e., negative or zero), it represents that the specific element corresponding to the user is less possible to reach the virtual scene boundary even if the moving speed thereof is high. Accordingly, the processor 104 may maintain or reduce the distance threshold, such that the virtual scene boundary of the VR environment may not be unnecessarily shown.

The disclosure further provides a computer readable storage medium for executing the method for dynamically showing a virtual boundary. The computer readable storage medium is composed of a plurality of program instructions (for example, a setting program instruction and a deployment program instruction) embodied therein. These program instructions can be loaded into the electronic device 100 and executed by the same to execute the method for dynamically showing a virtual boundary and the functions of the electronic device 100 described above.

In summary, the method provided in the disclosure may dynamically determine the distance threshold for showing the virtual scene boundary based on the moving speed of the specific element (e.g., the HMD) of the VR system. When the specific element moves fast (i.e., the user moves fast), the distance threshold would be larger, such that the virtual scene boundary may be shown earlier. Therefore, the user of the VR system may have enough reaction time to slow down, and hence the possibility of the user crossing the virtual scene boundary may be reduced.

On the other hand, when the specific element moves slowly (i.e., the user moves slowly), the distance threshold would be smaller, such that the virtual scene boundary may be shown later. Therefore, the user would not be interrupted by the unnecessarily shown virtual scene boundary.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically showing a virtual boundary, comprising:
   obtaining a virtual scene boundary of a virtual reality (VR) environment;
   determining a distance threshold based on a moving speed of a specific element of a VR system, wherein the distance threshold is positively related to the moving speed of the specific element;
   monitoring a specific distance between the specific element and the virtual scene boundary of the VR environment;
   in response to determining that the specific distance is smaller than the distance threshold, showing the virtual scene boundary of the VR environment,
   wherein after the step of monitoring the specific distance between the specific element and the virtual scene boundary of the VR environment, the method further comprising:
      obtaining a specific acceleration of the specific element in response to determining that the specific distance is equal to a reference distance, wherein the reference distance is larger than the distance threshold;
      enlarging the distance threshold in response to determining that the specific acceleration of the specific element is positive; and
      maintaining or reducing the distance threshold in response to determining that the specific acceleration of the specific element is not positive.

2. The method according to claim 1, wherein the specific element comprises a head-mounted display of the VR system.

3. The method according to claim 1, wherein in response to determining that the specific distance is not smaller than the distance threshold, the method further comprising:
   not showing the virtual scene boundary of the VR environment.

4. The method according to claim 1, wherein the step of determining the distance threshold based on the moving speed of the specific element of the VR system comprising:
   determining the distance threshold based on the moving speed of the specific element and a predetermined reaction time.

5. The method according to claim 1, wherein the step of determining the distance threshold based on the moving speed of the specific element of the VR system comprising:

determining the distance threshold based on the moving speed of the specific element, a predetermined reaction time, and an acceleration of the specific element.

6. The method according to claim 1, wherein after the step of showing the virtual scene boundary of the VR environment, the method further comprising:
in response to determining that the specific distance is not smaller than the distance threshold, hiding the virtual scene boundary of the VR environment.

7. The method according to claim 1, wherein in response to determining that the moving speed is smaller than a speed threshold, defining the distance threshold as a predetermined distance.

8. An electronic device, comprising:
a storage circuit, storing a plurality of modules; and
a processor, coupled to the storage circuit, accessing the modules to perform following steps:
obtaining a virtual scene boundary of a virtual reality (VR) environment;
determining a distance threshold based on a moving speed of a specific element of a VR system, wherein the distance threshold is positively related to the moving speed of the specific element;
monitoring a specific distance between the specific element and the virtual scene boundary of the VR environment;
in response to determining that the specific distance is smaller than the distance threshold, showing the virtual scene boundary of the VR environment,
wherein after monitoring the specific distance between the specific element and the virtual scene boundary of the VR environment, the processor is further configured to:
obtain a specific acceleration of the specific element in response to determining that the specific distance is equal to a reference distance, wherein the reference distance is larger than the distance threshold;
enlarge the distance threshold in response to determining that the specific acceleration of the specific element is positive; and
maintain or reduce the distance threshold in response to determining that the specific acceleration of the specific element is not positive.

9. The electronic device according to claim 8, wherein the specific element comprises a head-mounted display of the VR system.

10. The electronic device according to claim 8, wherein in response to determining that the specific distance is not smaller than the distance threshold, the electronic device further comprising:
not showing the virtual scene boundary of the VR environment.

11. The electronic device according to claim 8, wherein the processor is configured to:
determine the distance threshold based on the moving speed of the specific element and a predetermined reaction time.

12. The electronic device according to claim 8, wherein the processor is configured to:
determine the distance threshold based on the moving speed of the specific element, a predetermined reaction time, and an acceleration of the specific element.

13. The electronic device according to claim 8, wherein after showing the virtual scene boundary of the VR environment, the processor is further configured to:
in response to determining that the specific distance becomes not smaller than the distance threshold, hide the virtual scene boundary of the VR environment.

14. The electronic device according to claim 8, wherein in response to determining that the moving speed is smaller than a speed threshold, the processor defines the distance threshold as a predetermined distance.

15. A non-transitory computer readable storage medium, recording an executable computer program to be loaded by an electronic device to execute steps of:
obtaining a virtual scene boundary of a virtual reality (VR) environment;
determining a distance threshold based on a moving speed of a specific element of a VR system, wherein the distance threshold is positively related to the moving speed of the specific element;
monitoring a specific distance between the specific element and the virtual scene boundary of the VR environment;
in response to determining that the specific distance is smaller than the distance threshold, showing the virtual scene boundary of the VR environment,
wherein after the step of monitoring the specific distance between the specific element and the virtual scene boundary of the VR environment, the executable computer program to be loaded by the electronic device to further execute steps of:
obtaining a specific acceleration of the specific element in response to determining that the specific distance is equal to a reference distance, wherein the reference distance is larger than the distance threshold;
enlarging the distance threshold in response to determining that the specific acceleration of the specific element is positive; and
maintaining or reducing the distance threshold in response to determining that the specific acceleration of the specific element is not positive.

* * * * *